United States Patent [19]
Rege

[11] Patent Number: 5,612,897
[45] Date of Patent: Mar. 18, 1997

[54] SYMMETRICALLY SWITCHED MULTIMEDIA SYSTEM

[75] Inventor: Satish L. Rege, Groton, Mass.

[73] Assignee: Digital Equipment Corporation, Maynard, Mass.

[21] Appl. No.: 620,110

[22] Filed: Mar. 21, 1996

[51] Int. Cl.⁶ .................................................. H04L 12/00
[52] U.S. Cl. ........................................ 364/514 C; 395/806
[58] Field of Search ........................... 364/514 C; 370/60, 370/53, 85.5; 395/154, 275; 348/6, 7, 16, 17

[56] References Cited

U.S. PATENT DOCUMENTS 4,967,345  10/1990  Clarke et al. ................... 364/514 C
5,485,455  6/1996  Dobbins et al. ..................... 370/60

Primary Examiner—Emanuel T. Voeltz
Assistant Examiner—Thomas Peeso
Attorney, Agent, or Firm—Dirk Brinkman

[57] ABSTRACT

A multimedia system for delivering multimedia content items to customer premises equipment via a circuit of a communications network includes a plurality of substantially identical nodes connected in a symmetric mesh. Each node includes a switch and a server. The server includes disk storage for the multimedia content, a switch interface for connecting the server to the switch, and a network adapter for connecting the server to the communications network. Source nodes fetch data from disk, routing nodes transport data among nodes, and destination nodes transport the data to the communications network. The switch is a store-and-forward switch including direct memory access engine for pulling data into the switch, and a buffer for storing data to be forwarded to another switch. Portions of each content item are distributed substantially equally over the available storage media to improve load balancing and data redundancy.

12 Claims, 10 Drawing Sheets

SYMMETRICALLY SWITCHED MULTIMEDIA SYSTEM

FIELD OF THE INVENTION

This invention relates generally to computer systems, and more particularly to computer systems for delivering multimedia content on-demand.

BACKGROUND OF THE INVENTION

Servers of a multimedia system have access to pre-stored multimedia content items. Content items can include games, movies, sporting events, advertising, music, files, databases, etc. Typically, the content of the multimedia is encoded as video, audio, text, and images. Digitally encoded signals representing the multimedia content can be stored on magnetic or optical media prior to delivered.

In response to customer demands, the servers can deliver the stored content items as transport streams. The transport streams, according to industry standard encoding, e.g., Motion Picture Expert's Group (MPEG), include a plurality of transport stream (TS) packets. The TS packets of the transport stream can be transported to customer premises equipment via a circuit of a communications network using, for example, asynchronous transfer mode (ATM) communication protocols.

FIG. 1 shows a prior art arrangement of a multimedia system 100. The system 100 includes multimedia servers 121–123 connected to disks 101–103. The disks 101–103 store multimedia content items 111–113. The multimedia servers 121–123 are connected by a bus 130. The servers 121–123 can access the disks 101–103 and format the content 111–113 into a transport stream in real time.

An essential part of the system 100 is a routing switch 140. The switch 140 establishes the "connection" between the servers "playing" the multimedia content items and endpoint customers. This means the switch 140 routes the transport streams via network ports 150 to a communications network 160. Circuits 180 of the communications network 160 are connected to customer premises 170. The premises 170 includes a set-top box 172 and a display device 173, for example a television.

During operation of the system 100, delivery of selected multimedia content item 111 is initiated at the customer premises 170. A customer makes a demand using, for example, a hand held remote control device and the set-top box 172. In response to the demand, the circuit 180 is established between one of the servers 121–123 and the premises 170. The circuit 180 can be physical or virtual. The dotted line 180 generally indicates a possible path travelled by the transport stream from the server 121 to the customer premises 170.

One problem with the prior art arrangement is load balancing. If the selected multimedia item 111 is popular, then it is likely that the server 121 will need to manage a large number of transport streams. However, the server 123 attached to the disk 103 storing a less desirable content item 113 is under utilized. It would be possible to store multiple copies of popular items so that more than one server can create transport streams. However, given that digitized content can consume as much as two to four gigabytes of storage, maintaining several copies of popular content items wastes storage space and increases the cost of the system. In addition, the viewers' preferences as to what is popular at any one time shifts rapidly. This makes it difficult to match up content with servers.

As another problem, the prior art arrangement is prone to single points of failure. Should there be a problem with the disk 101, the server 121, or the switch 180, the performance of the system is severely degraded. For example, failure in the disk 101 or the server 121 makes all the multimedia content stored on the disk 101 unavailable to use. Failure in the switch 140 may incapacitate the entire system.

As yet another problem, it is difficult to scale the system 100 to deliver increasing amounts of content to an increasing number of customers. Distribution of the content over the disks and the servers must be carefully monitored. Dynamically adjusting the arrangement of the content, disks, and servers is difficult and consumes resources. As the load is increased, the system may need to be upgraded to include more processors, or higher-performance processors and larger memories.

Therefore, there is a need for a multimedia delivery system which can dynamically balance the load over all of the resources of the system without a substantial rearrangement of the components. Furthermore, the system should also be tolerant to a single point or multiple points of failure. In addition, the basic building blocks of the system should facilitate simple scaling of the system as the size of the content and the number of customers increase.

SUMMARY OF THE INVENTION

A system for delivering multimedia content to customer premises equipment via a circuit of a communications network is configured as a plurality of substantially identical nodes arranged in a symmetric mesh. Each node includes a switch and a server. The server of each node includes disk media for storing multimedia content items. The content items can be movies, databases, music, and so forth. The server also includes a switch interface for connecting the server to the switch, and a network adapter for connecting the server to the communications network. The server may also include other input and output interfaces for connecting to peripheral equipment such as terminals, secondary storage, and other networks. A data and control network connects the plurality of nodes of the mesh for uni-directional data flow.

Associated with each node is a unique address. The addresses are used to route data and control packets between the nodes. A node can concurrently be designated a source, routing, or destination node depending on the flow of the data and control packets over the data and control network.

When operating as a source node, the node fetches data representing multimedia content from the disk storage of the node. While operating as a routing node, the nodes transports data among nodes. In destination mode, the node presents content received at the node to the communications network.

The switch is a store-and-forward switch including direct memory access engines for pulling data into the switch, and buffers for storing data to be forwarded to other switches or the node's server. The switch also includes a parser/router for determining the routing of the data received at input ports of the switch to output ports of the switch based on address information carried by the data and control packets.

In one aspect of the invention, the nodes are symmetrically connected to each. For example, the nodes can be connected in a two-dimensional plane. Planes of nodes can further be connected as a three-dimensional cube. Because the nodes are connected symmetrically, the routing of the multimedia content can be done statically. Static routing means that the routing from node to node is normally unchanged over time. As an advantage of the invention, this greatly simplifies routing algorithms and circuits.

In another aspect of the invention, the disk storage is organized as a hierarchy of redundant arrays of independent disks. This allows for each content item to be distributed substantially equally over all of the available media of the nodes. In addition, organized as a redundant array, parity nodes and storage node can be included to reconstruct data representing content in case of a media failure.

DETAILED DESCRIPTION OF A PREFERRED EMBODIMENT

Figure 2:
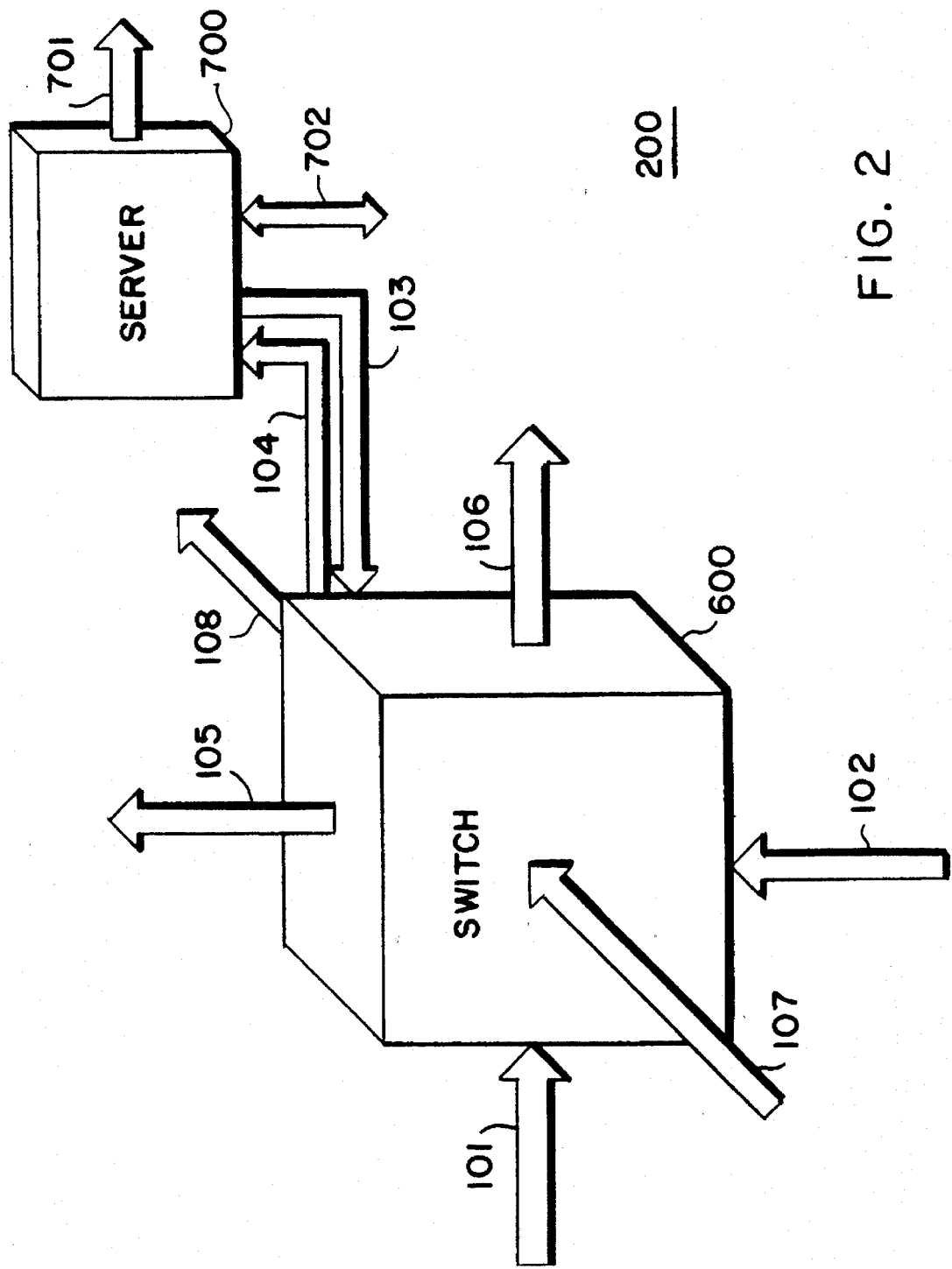
FIG. 2 is a block diagram of a basic multimedia building block or node including a switch and a server according to the principles of the invention.

FIG. 2 shows a basic building block or node 200 of a multimedia delivery system according to a preferred embodiment of the invention. The node 200 comprises a switch 600 and server 700. The server 700, as shown in greater detail in FIG. 7, can include a processor, disk storage, a memory, network adapters, input/output (I/O) interfaces, and a switch interface, all connected to each other by a bus.

An exemplary switch 600, as shown in FIG. 2, comprises inputs 101–103 and 107, and outputs 104–106 and 108. The inputs 101–103 and the outputs 104–106 can interconnect a plurality of nodes via a data and control network to other similar switches. For example, the nodes can be connected as a ring. In this case, each switch 700 only needs a single input and a single output. Alternatively, when the nodes are connected as a plane, each switch 700 needs two inputs and outputs. For a cubic arrangement of nodes 200, each switch needs three inputs and outputs. The inputs and outputs 103–104 interconnect the switch 600 and the multimedia server 700 of the node 200.

Figure 1:
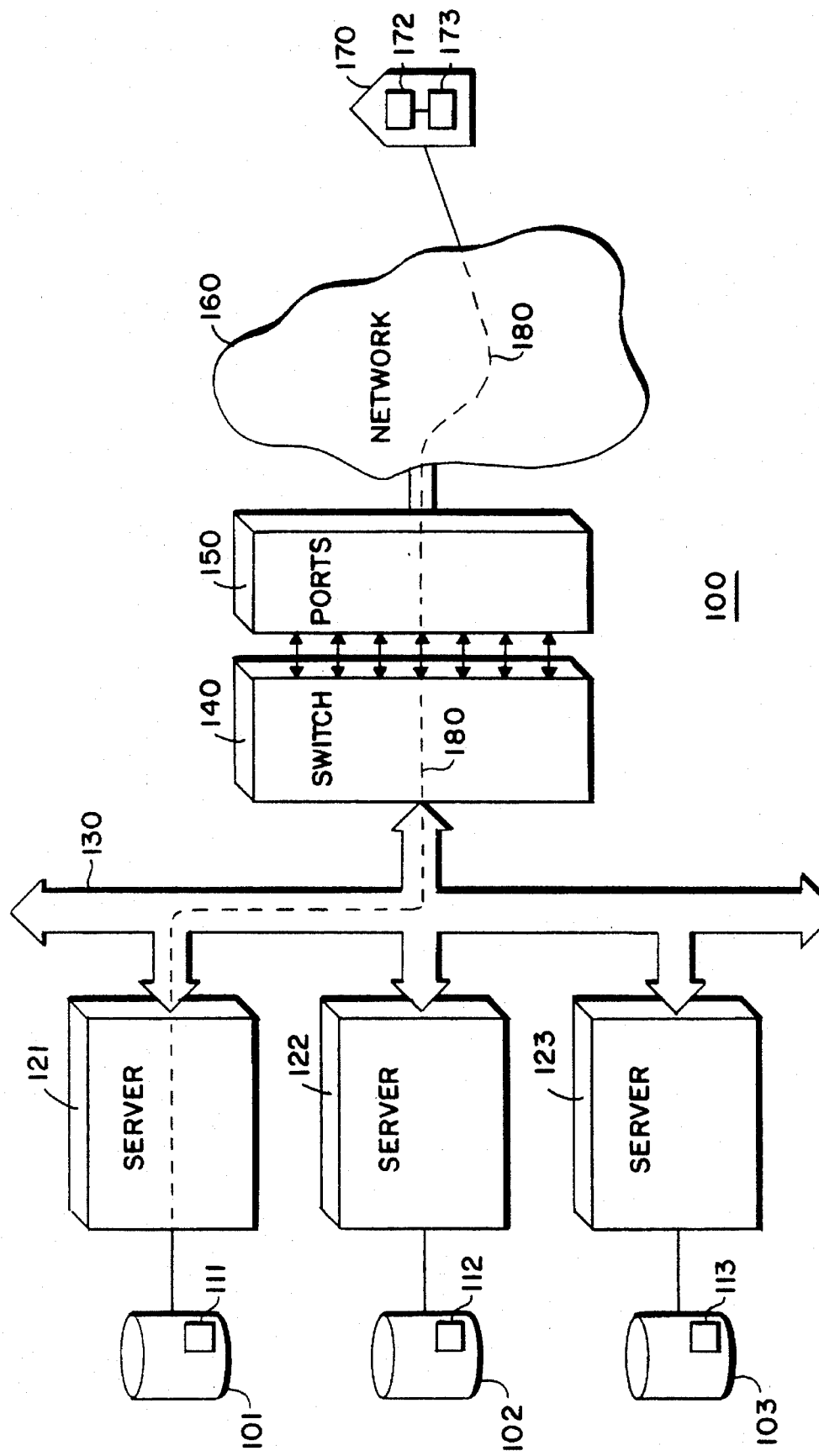
FIG. 1 is a block diagram of an arrangement of a prior art multimedia delivery system.

Line 701 connects the server 700 to, for example, the wide area communication network (WAN) 160 of FIG. 1. Line 702 can be part of a separate local area network (LAN) using, for example, FDDI protocols. The LAN 702 can be used to interconnect the servers 700 for control purposes.

Figure 3:
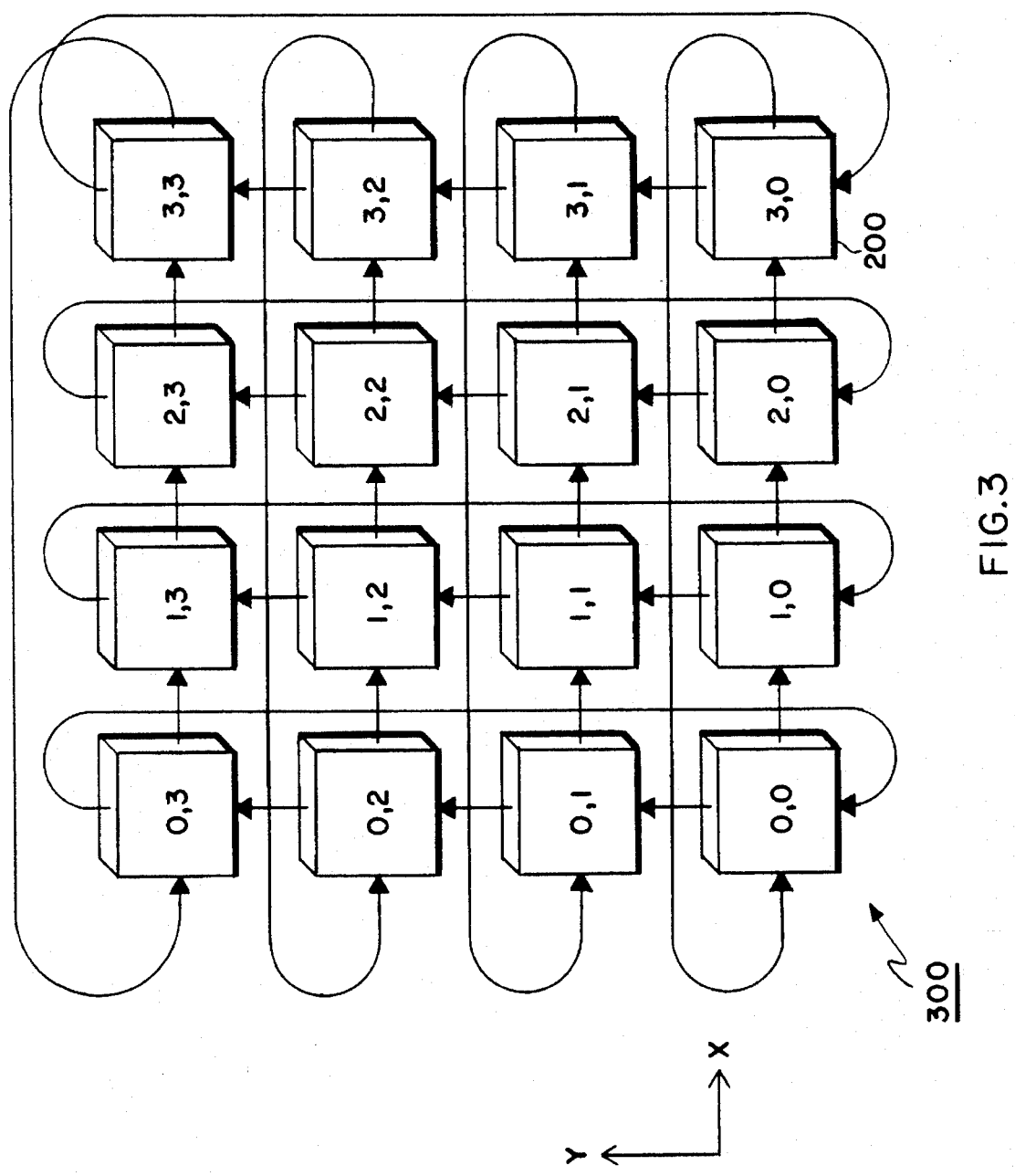
FIG. 3 is a block diagram of a two-dimensional arrangement of a plurality of nodes of FIG. 2 connected into a plane by a data and control network.
Figure 4:
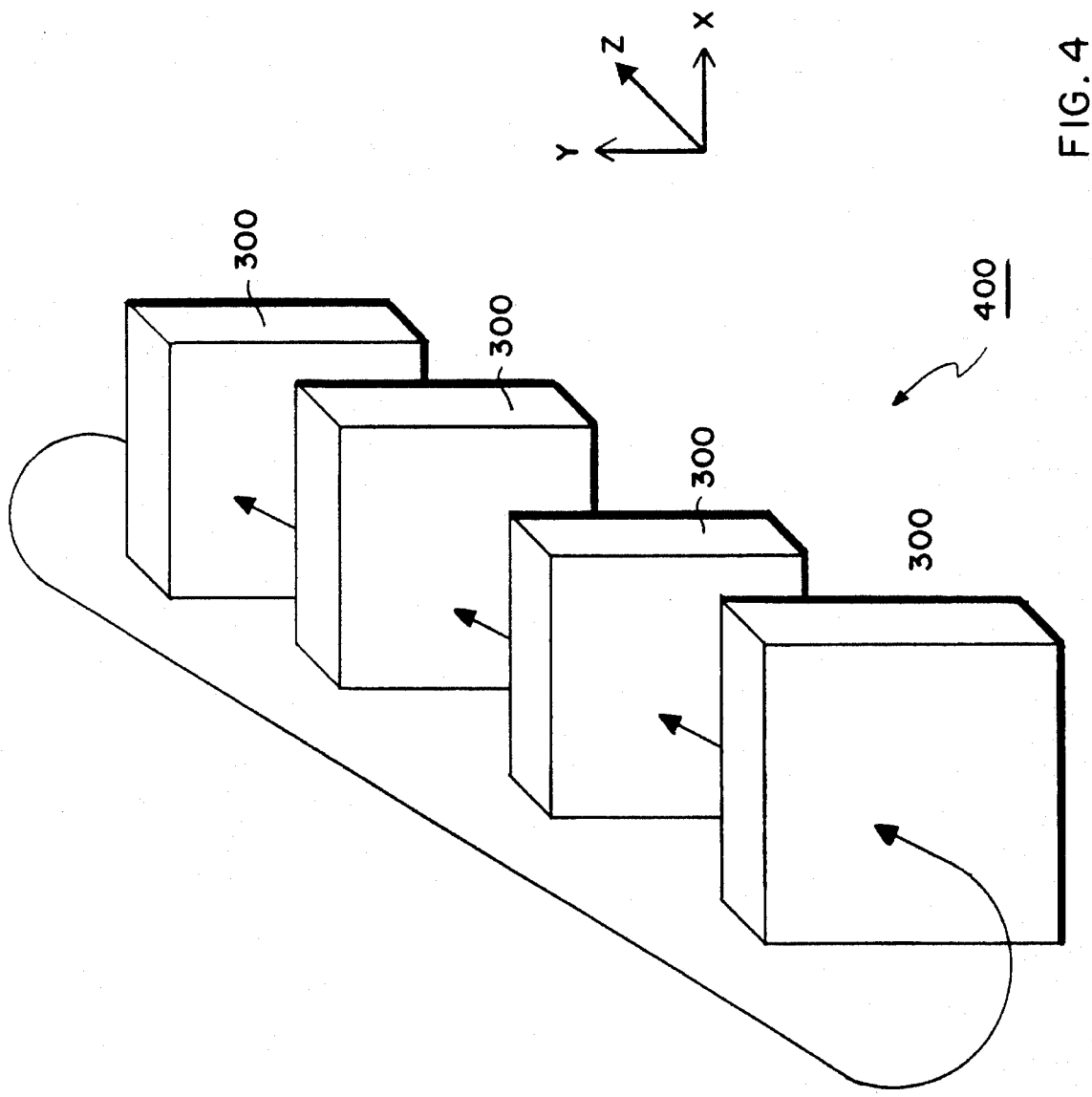
FIG. 4 is a block diagram of a three-dimensional arrangement of two-dimensional planes of nodes of FIG. 3.

FIGS. 3 and 4 show some possible arrangements of the nodes 200 of FIG. 2. For example, FIG. 3 shows a plurality of nodes 200 symmetrically connected in a two-dimensional plane 300 by the data and control network. As shown in FIG. 4, a plurality of two-dimensional planes 300 can be arranged as a three-dimensional parallelpiped, e.g., the cube 400 by interconnecting the nodes 200 using the additional inputs 107 and outputs 108 of FIG. 2.

In alternative embodiments, the nodes 200 can be arranged in meshes having a higher or lower order of dimensionality. For example, the nodes can be connected as a ring or as a hypercube.

Associated with each node 200 is a unique address. The address can be expressed, for a two-dimensional plane, in terms of the Cartesian "x" and "y" coordinates of the mesh. For example, the nodes 200 of the plane 300 of FIG. 3, can be addressed (0,0) though (3,3) where the bottom left-most node is the "origin." Similarly, the nodes 200 of the cubic arrangement 400 of FIG. 4 can be addressed (0,0,0) through (3,3,3) using "x," "y," and "z" coordinates. This addressing scheme simplifies the routing of the packets through the nodes.

Figure 5:
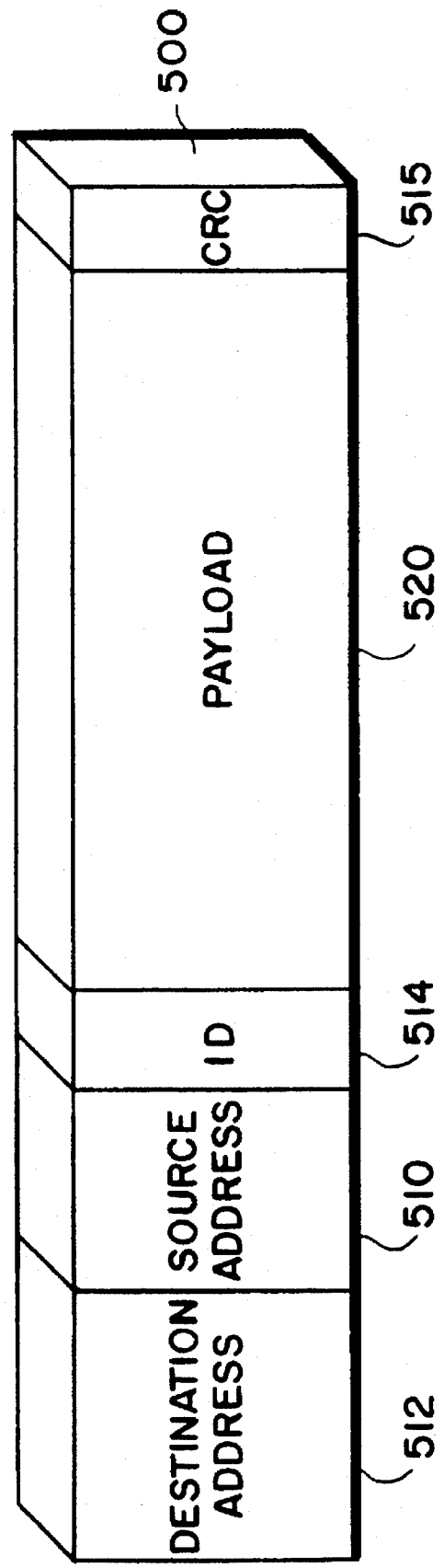
FIG. 5 is a block diagram of a data packet which can be routed through the arrangements of FIGS. 3 and 4.

FIG. 5 shows a data packet 500 which can be routed through the nodes 200 according to the above addressing scheme. The routing, in part, can be enabled by incorporating address and identification information into the packet 500. The data packet 500 includes payload 520, source address information 510, destination address information 512, content identification information (ID) 514, and an error correcting code (CRC) 515. The CRC 515 ensures that the packets 500 remain correct as they are routed from node to node. The payload 520 can be one or more transport stream packets encoded according to the MPEG standard, or any other multimedia transporting standards.

The address information 510 and 512 are encodings of the addresses of a source node and a destination node. During operation, a server of a source node fetches multimedia content from disk storage of the server. The processor of the source node server can include means for formatting the transport stream packets into the payload 520 of the data packets 500. A server of a destination node presents the sourced multimedia content to the communications network 160 of FIG. 1.

The identification 514 enables the nodes to concurrently process data packets of multiple transport streams for many customers. Each concurrently delivered transport stream has a unique identification 514 of a specific multimedia content, for example the identification of a segment of a movie to be delivered to s specific customer.

The switch 600 is a store-and-forward component. This implies that packets 500 are pulled into a switch at the input ports of the switch 600 to avoid data loss. All packets received at the input ports are stored in a buffer prior to forwarding to the outputs of the switch. Cut-through is employed to avoid undue latencies while forwarding large packets. Cut-through implies that forwarding of a packet can be initiated before the entire packet is received.

The inputs and outputs are designated from a viewpoint of the switch 600. For example, data enters the switch 600 at an input port, and data exits at an output port of the switch. According to one embodiment of the invention, the direction of flow of data packets over the data and control network interconnecting the nodes is uni-directional and static over time. Static routing means that the routing from node to node is predetermined. Therefore, the switch ports and circuits of the data and control network connecting the ports can be half-duplex.

The circuits connecting the switch ports can be configured as a data and control network. The data and control network can be buses. For a multimedia system, the traffic on the data paths will be quite large, therefore the portion of the buses used for transporting the data packets will need a large bandwidth.

As shown in FIGS. 3 and 4, the output of one node is connected to the input of the next adjacent node having greater x, y, or z coordinate addresses. The output of the last node in a row or column, or plane wraps around to the node of the first row, column, or plane. This arrangement connects each node to every other node using half-duplex data circuits. In addition, the wrap around connections makes the system symmetrical since the mesh looks identical from the viewpoint of any node. Since the mesh is symmetrical, static routing can be used.

Figure 6:
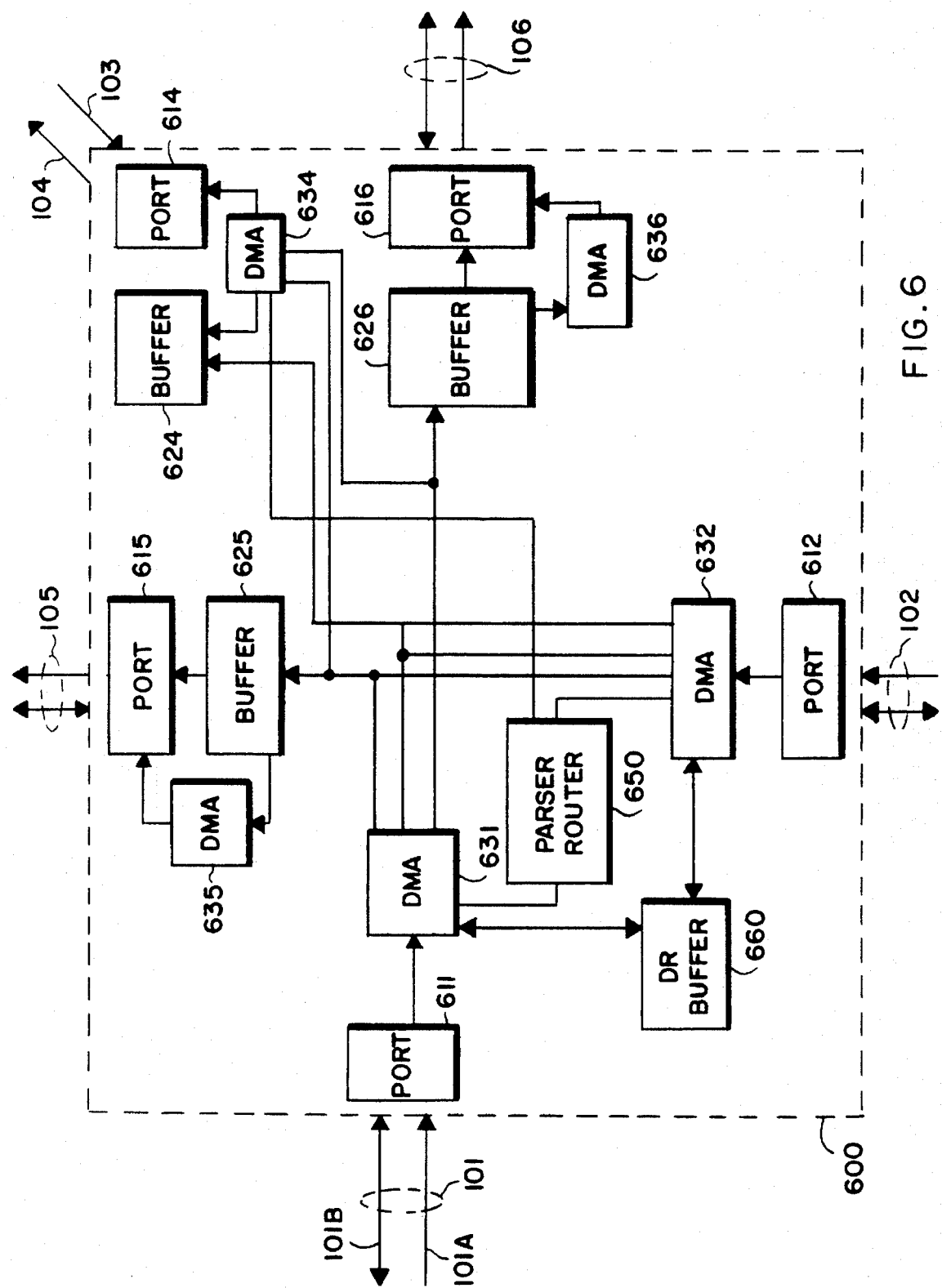
FIG. 6 is a block diagram of the switch of the node of FIG. 2.

FIG. 6 shows a preferred embodiment of the switch 600 used in a two-dimensional mesh of nodes 200. The switch 600 includes input ports 611–612 and output ports 615–616 connected respectively to the inputs 101–102 and the outputs 105–106 of the data and control network.

Each of the inputs 101–102 and outputs 105–106 includes uni-directional signalling lines for data signals, e.g., the packets 500, as indicated by a single headed arrow, for example 101A, and bi-directional signalling lines for control signals, as indicated by the double headed arrow, for example, 101B. The control signals can include timing, priority, busy, and other similar control signals necessary for operating the buses of the data and control network. A server port 614 connects the switch 600 to the server 700.

Connected to the server port 614 and output ports 105–106 are buffers 624–626. If permitted by available bandwidth and memory design, it may be possible to implement the buffers 624–626 as a single partitioned randomly accessible memory.

Connected to each of the input ports 611–612 are direct memory access (DMA) engines 631–632, respectively. The DMA engines 631–632 are designed to pull data from the output ports of an adjacent switch into the switch 600 via the data and control network. The routing of packets through the switch 600 is determined by a parser/router 650. The parser/router 640 basis its routing decisions on the destination address information associated with the data packets 500 of FIG. 5.

For example, the router/parser 650 first parses the destination address 512 of the packets 500. A determination is made if the destination address is the address of the current node. If this determination is true, then the packet is routed to the buffer 624. Otherwise, if false, the packet is routed to one of the output ports connected to an immediately adjacent node.

A server DMA engine 634 moves data between the switch 600 and the server 700. The server DMA engine 634 can push packets from the switch 600 to the server 700, and the DMA engine 634 can pull packets from the server 700 into the switch. 600. The server DMA engine 634 is also connected to the parser/router 650 for routing control.

The switch 600 includes a deadlock resolution (DR) buffer 660. The DR buffer 660 is used to store overflow data packets 500 in the case that all of the output buffers 624–626 of a row or column become full. If all of the output buffers 624–626 are allowed to remain full, then a deadlock situation may arise. A deadlock could stop the system from functioning.

Figure 7:
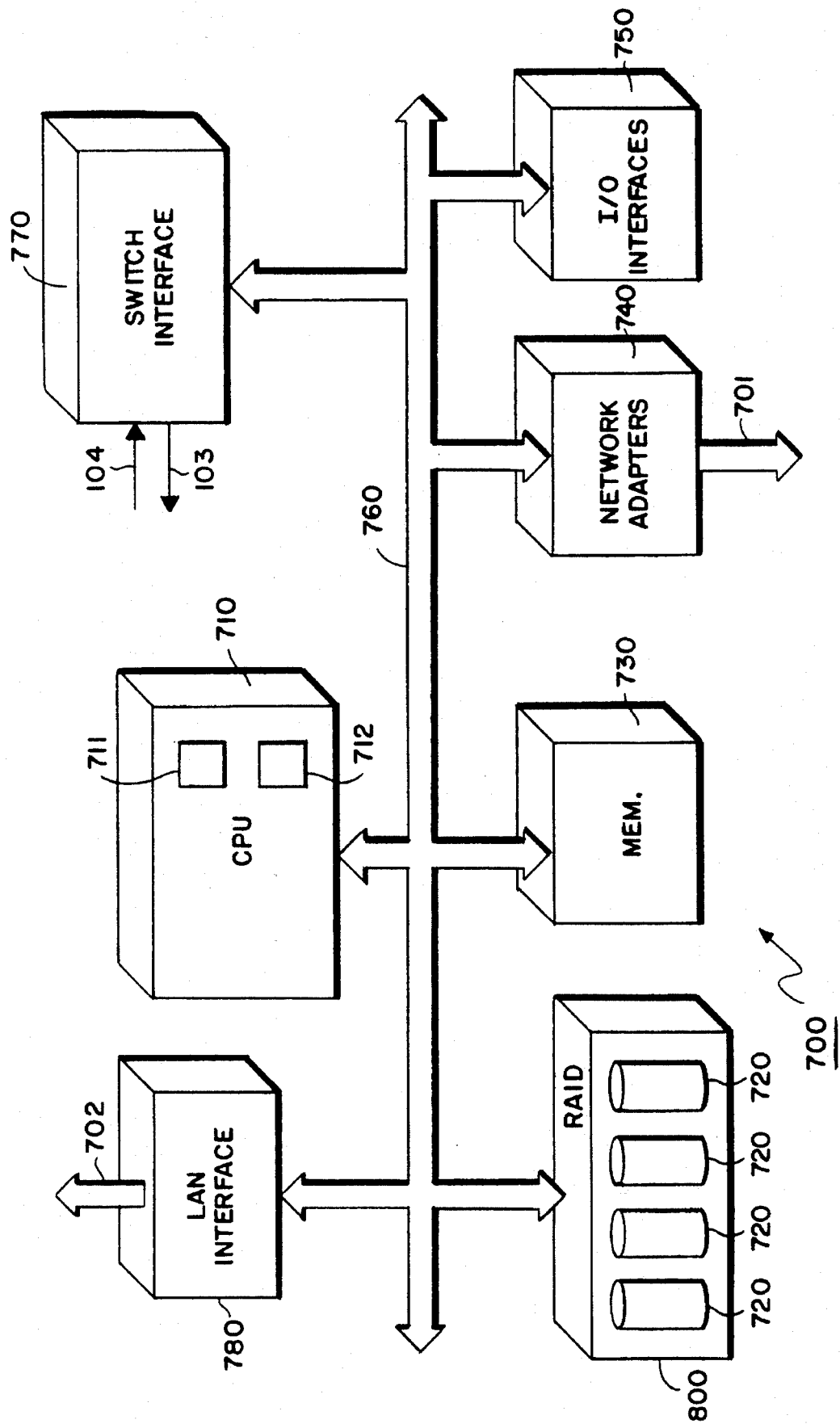
FIG. 7 is a block diagram of the server of the node of FIG. 2.

As shown in FIG. 7, the server 700 of the node 200 includes a processor (CPU) 710, an array 800 of disks 720, a memory 730, network adapters 740, and input/output (I/O) interfaces 750, all connected to each other by a server bus 760. The server 700 also includes a switch interface 770 for connecting the server 700 to the switch 600 of FIG. 6. The server 700 can also a local area network (LAN) interface 780 for interconnecting the servers of the nodes for control purposes, described in further detail below.

As an advantage over the prior art, the processor 710 can be inexpensive using, for example, a RISC architecture. The major property that makes a processor a candidate for implementation is cost effectiveness and an ability to be balanced. Being balanced implies that the server 700 has substantially equal input and output throughput capabilities at the hardware and software levels. If the input and output capabilities are balanced, then the total data fetched by the processor 710 from the local disk 720 and the storage of other nodes is almost equal to the total data transmitted by the CPU 710 over the communications network 160 via line 701.

The server 700 can include a formatter 711 for formatting the data representing the multimedia content of the transport stream packets into data packets 500. The formatter 711 can be implemented as a software program executing in the processor 710. If higher throughput is desired, the formatter 711 can be implemented by hardware circuits which append the address, ID, and CRC information. In addition, the server 700 can include a control packet generator 712. Control packets are used to coordinate the activities of the nodes during operation. For example, a request control packet, described in greater detail below, requests multimedia content from a source node. The server 700 can also maintain data structures and processes which maintain associations between customers and selected multimedia content items that are being delivered.

Figure 8:
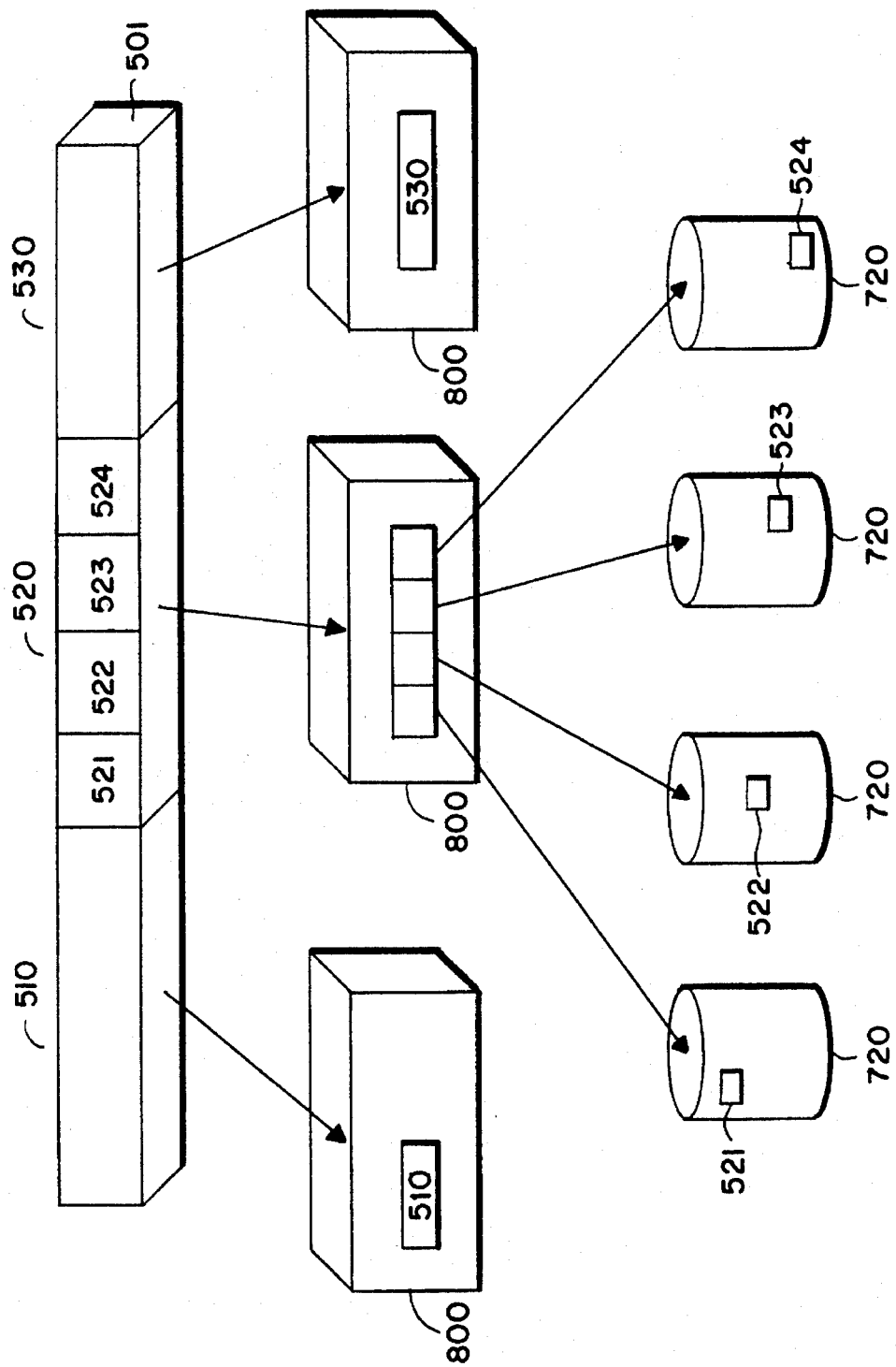
FIG. 8 is a block diagram depicting the distribution of multimedia content items as stripes over the storage of the plurality of nodes.

FIG. 8 shows a preferred distribution of content items over the disks 720. The disks 720 of all the nodes 200 are arranged as a hierarchy of redundant arrays of independent disks, e.g., a RAID type of storage device. In a RAID storage device, the address space of all of the disks 720 of the array 800 form a singular logically contiguous space. In addition, in RAID storage, data integrity is preserved by having some of the disks space dedicated to storing parity information. If there should be a failure in any of the disks, then the data can be reconstructed from the remaining data and the parity information.

As shown, a selected multimedia content item 501, for example a movie, is partitioned into a plurality of stripes 510, 520, and 530. The stripes of the content item 501 are distributed substantially equally over all of the arrays 800 of the nodes 200. This means that if the entire movie is played to a customer, each of the nodes 200 is responsible for sourcing an equal amount of the content. Furthermore, each of the stripes is further partitioned into a plurality of sub-stripes, e.g., sub-stripes 521–524. The sub-stripes are also distributed substantially equally over all of the disks 720 of a particular array 800.

For example, the first stripe 510 of the content item 501 is stored on the array 800 of node (0,0) of FIG. 3, the second stripe 520 is stored on node (1,0), and so forth. The sub-stripes 521–524 of the second stripe 520 can be distributed over the disks 720 of node (1,0). Other content items can similarly be distributed. Hierarchically striping and sub-striping the multimedia items over the disks 720 of the arrays 800 makes it easy to replace or otherwise maintain the content. The striping also facilitates load balancing during delivery of multimedia content items.

In addition to equally distributing the stripes and sub-stripes, the stripes and sub-stripes can also be randomly distributed. Random distribution means that successive stripes of a particular multimedia item are not necessarily stored on nodes having successively higher address coordinates. By randomly distributing the multimedia content, access to the multimedia by different customers is randomized over the nodes to smooth out disk I/O load even if the stripes are normally "played" sequentially.

Now, the routing of multimedia content items among the nodes according to the preferred embodiment of the invention is described in greater detail. During operation of a multimedia-on-demand system arranged as described herein, a static routing method is preferred. The static routing is symmetric over all nodes of the mesh. During static routing, the nodes 200 behave as either a source node, a routing node, or a destination route.

A source node is responsible for fetching any portions of a customer selected content item stored in the storage devices of the attached server in response to customer demands. A routing node forwards packets from one node to an adjacent "down stream" node. A destination node transmits the content out onto the communications network 160 of FIG. 1.

If each of the content items is striped substantially equally over the arrays 800 of the nodes 200, then, as an advantage of the invention, the load induced on the system to deliver the content item is balanced over the nodes irrespective of the mapping of customers to nodes, in sharp contrast with the prior art. Moreover, if customers are equally distributed over the destination nodes, the output load is also balanced, even if the demand for popular multimedia items is highly skewed. Then, if both of the above conditions are maintained, then the load due to routing portions of content to other nodes is also balanced.

When a customer demands a selected multimedia content item, a particular node is designated the destination node for the data packets 500 of the selected content item. This means that the communications network circuit 180 of FIG. 1 exists between the customer premises 170 and the destination node. Since the multimedia items are striped substantially equally over all of the nodes, it does not matter which node is designated the destination node for the selected content. The source and routing nodes are used to gather the portions of the selected multimedia content for the destination node.

The destination node generates request control packets for the various portions of the selected content item. The control packets are routed to the source nodes storing the various distributed stripes which comprise the entire selected content item. The request packet can be a variation of the data packet 500 of FIG. 5.

It should be noted, that with respect to control packets, the "destination" node for the requested content is file source node of the request control packet. Similarly, the "source" node of the content is the destination node for the request control packet.

Figure 9:
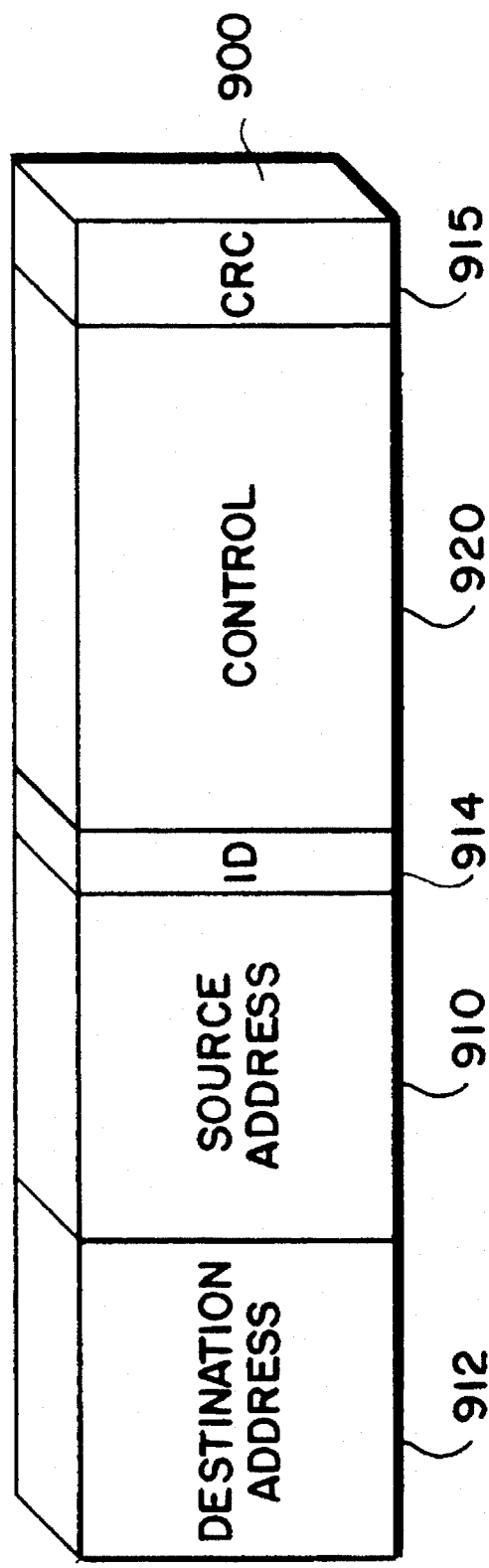
FIG. 9 is block diagram of a request control packet.

FIG. 9 shows a preferred embodiment of a control packet 900 generated by the generator 712 of a destination node of content. The control packet 900 includes a source address field 910, a destination address field 912, a control field 920, and an identification field 914. The packet can also include a CRC field 915 for error correction. The control field 920, e.g., the payload, can be, for example, the disk address of the requested portion of the content item selected by the customer.

In response to customer demands, for example a demand for a selected movie, the "destination" node for content generates appropriate request control packets 900. The control packets are send to the appropriate source nodes. The "source" nodes for the requested content parse the control field 920 to extract the portion address and fetch the data of the content from the attached disks 720.

The content is formatted as data packets 500 by the formatter 711. The data packets 500 are routed to the destination node, if necessary, via routing nodes. The switch 700 of the destination node recognizes its own data packet 500. Recognized data packets are intercepted and forwarded to the attached server 700. The server extracts the payload 520 of the data packets 500. The payload 520 is presented to the communication network 160 via line 701 of the destination node as, for example, MPEG transport stream packets.

In an alternative embodiment, the control packets 900 can be carried on a separate network than the network used for transporting the data packets 500 among the nodes. For example, the control packets 900 can be carried on a local area network (LAN) 702 connected to the servers 700 by the LAN interface 780 of FIG. 7. The LAN can operate using FDDI or Ethernet protocols.

The control packets can also include status control packets, indicating, for example, load information, node failures, rerouting information, priority information, or other positioning information necessary for delivery of multimedia content to the customer.

During normal operation, the portions of the selected multimedia content item are accessed sequentially. Should the customer wish to view portions of the content out of their normal sequential order, the destination node, in response to customer initiated demands, e.g., fast-forward, skip, pause, rewind, etc., can formulate other control packets 900 to fetch the portions of the multimedia content in any order.

In the case of a failure in one of the disks being used to source the content, the source node or the RAID storage devices 800 can reconstruct any lost portions of the content from the remaining portions of the content and the parity data stored in the parity disks of the parity node or nodes. Reconstructed content can be routed to the destination nodes as described above. The lost data can be rewritten to the disk array 800 of the server during off-peak times.

In the case of a failure of one of the processors, delivery of the selected content can be assumed by any other surviving node. In the case of a failure of an entire node, an alternate route can be used to transport the data packets around the failed node. The alternate routing can be predetermined, e.g., static. For example, with reference to FIG. 3. If the source node is node (0,0), and the destination node is node (2,0), a normal routing would be through node (1,0). However, should the switch of node (1,0) become inoperative, the alternate routing can be through routing nodes (0,1), (1,1), (2,1), (2,2), and (2,3) to destination node (2,0). As a feature of the invention, the switches can be self-routing.

In a preferred embodiment of the invention, the arrangement of the nodes can be changed while the system is operating, that is "on-line." For example, with reference to FIGS. 3, and 4. The single plane system of FIG. 3 can be expanded to a multi-plane system as shown in FIG. 4 as follows.

During operation of the single plane arrangement, assemble and test one or more additional planes. If the additional planes are found to be functional, interconnect the inputs and outputs of the planes in the "z" direction. Once the physical connections have been made, update the logical algorithms of the nodes to indicate the existence of the one or more additional planes. Lastly, enable the ports connecting the additional planes to allow the electrical signals representing the requests and data packets to flow. The technique used to expand the system from two dimensions to three dimensions can also be used to expand a two dimensional system. In the later case, the units of expansions are rows or columns of nodes that assembled and test prior to interconnecting.

Table 1 shows a preferred algorithm that can be used by the switches to implement the routing of the invention. The process of Table 1 is expressed in terms of a pseudo high-level programming language, e.g. C, Pascal, or ALGOL. In the algorithm, Xdest, Ydest, and Zdest refer to destination addresses of the nodes. Xrout, Yrout, and Zrout refer to addresses of routing nodes. The simplicity of the routing enables a hardware implementation in the switch to accrue the benefits of low overhead and low latencies.

TABLE 1

If Zdest NEQ Zrout then route the packet along the Z-axis
  else
If Xdest NEQ Xrout then route the packet along X-axis
  else
If Ydest NEQ Yrout then route the packet along the Y-axis
  else
Packet is at destination node, deliver packet to CPU.

Figure 10:
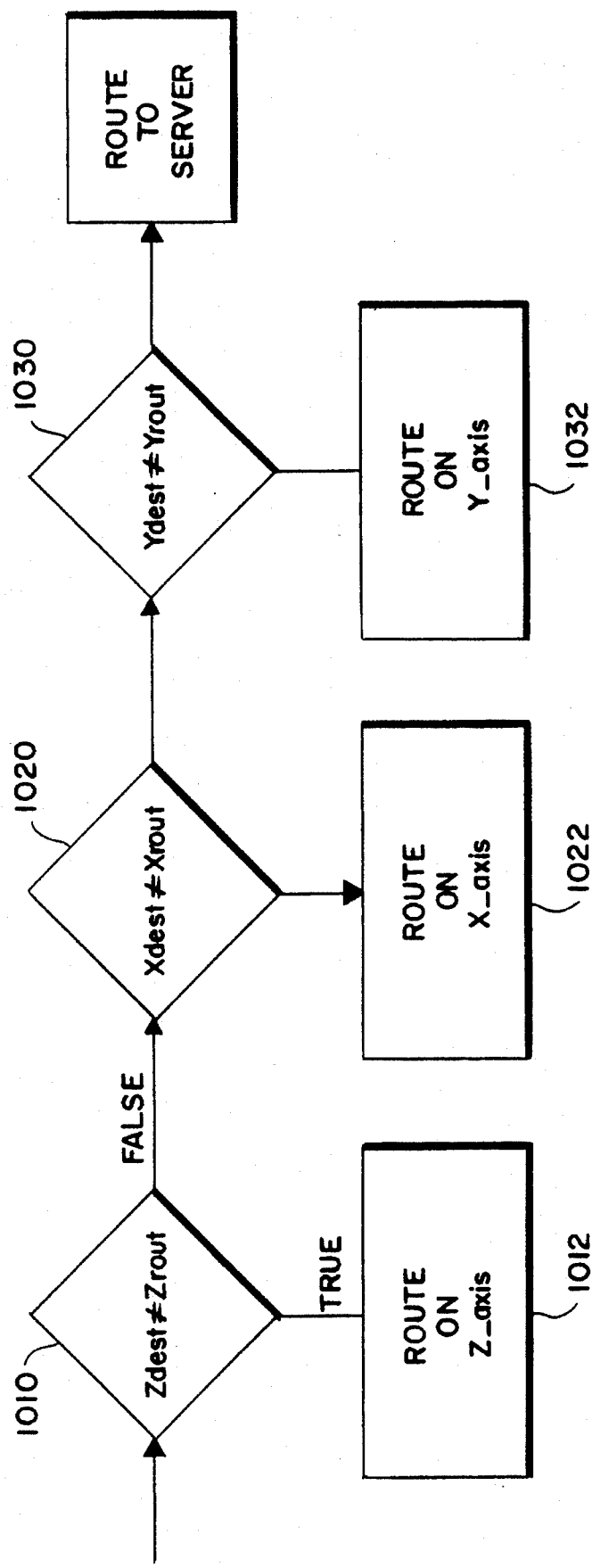
FIG. 10 is a flow diagram of a routing process.

In general, with reference to FIG. 10, the routing is as follows. Data packet traffic is sourced from a disk at a source node. The source node is the node storing the currently requested portion of the content. Once the data enter the switch from the local server, the source node now becomes the routing node. In step 1010, determine if the routing node is in the same "z" plane as the destination node. If not, route along the z-axis, step 1012. Otherwise, in step 1020, determine if the routing node is in the same "x" row as the destination node. If not, route along the x-axis, step 1022. Otherwise, in step 1030, determine if the routing node is in the same column as the destination node. If not, route along the y-axis 132. Otherwise, the routing node is the destination node. forward the packet to the local server.

In alternative routing algorithm, the routing for even numbered columns is different than the routing for odd numbered columns. Data along even numbered columns are routed as described above. Data along odd numbered columns can first be moved along y-axis, and then along the x-axis of the same node. This scheme may be more effective for load balancing.

In yet another routing algorithm, the routing alternates between the x-axis and the y-axis. This means a first packet is routed along the x-axis, a second packet is routed along the y-axis, and a next packet again along the x-axis, and so forth. In this routing scheme, the alternate routing is done conditionally so that packets are always forwarded towards the destination node, and not away from it.

Although the routing has been described with respect to a static routing algorithm, it is also possible to work the invention with a dynamic routing algorithm. With this routing algorithm, the routing could be dynamically adjusted to avoid nodes that are excessively loaded. However, dynamic routing scheme may introduce delays while the dynamics of system loading are analyzed and distributed to other nodes.

In addition, the addressing scheme can be modified to allow packets to carry multiple addresses, or groups of addresses. For example, a group address can be an entire row, column, or plane. Then, a single packet can concurrently route highly popular content items to a large number of customers without an undue increase of routing and I/O processing.

Although the exemplary system delivers multimedia content items to customer premises equipment, such as televisions, via a wide area public access network, the invention can also be used for delivering multimedia presentation using a corporate private network. Here the functions of the customer premises equipment of FIG. 1 can be assume by a multimedia workstation. The system can also be configured to deliver content to multimedia PCs using a data network such as the Internet.

Disclosed is a symmetric architecture of a switched multimedia content delivery system. Symmetry promotes load balancing. In addition, the symmetric nature of the system, makes it immune to single, and possibly multiple simultaneous points of failure in the hardware and the data. Furthermore, the basic building blocks of the symmetric arrangements enable a simple scaling of the system as processing needs change.

It is not intended that the present invention be limited to the specific embodiment disclosed in the above description and the associated drawings. Numerous modifications and adaptations of the invention will be apparent to those skilled in the art. Thus, it is intended by the following claims to cover all such modifications and adaptations falling within the scope of the invention.

I claim:

1. An apparatus for delivering multimedia items to customers via a communications network, comprising:

a plurality of nodes, each node including a switch connected to a server, each server including means for connecting to the communications network and means for storing a different portion of a selected multimedia item, and the switch including a first direct memory access engine connected to an input port of the switch, the first direct memory access engine for acquiring the different portions from an adjacent node via the data and control network, and an output buffer connected to an output port, the output buffer for storing the different portions acquired by the first direct memory access engine; and a data and control network symmetrically connecting the plurality of nodes to each other.

2. The apparatus as in claim 1 wherein the server further comprises:

a processor, a memory, and input/output interfaces connected to each other and the means for storing by a server bus.

3. The apparatus as in claim 2 wherein the server further comprises means for generating packets to route the different portions among the plurality of nodes, each packet includes a payload representing the portions of the multimedia content items.

4. The apparatus as in claim 3 wherein each node includes a unique address, and each packet includes a source address and a destination address of a source node and a destination node.

5. The apparatus as in claim 1 wherein the switch further comprises:

a second direct memory access engine connected to a server port of the switch, the second direct memory access engine for transferring the different portions between the switch and the server of the node; and a server buffer for storing the different portions transferred between the switch and the server.

6. The apparatus as in claim 5 wherein the switch further comprises:

a deadlock resolution buffer for storing the different portions if the output buffer and server buffer are full.

7. The apparatus as in claim 1 wherein data and control network routes the different portions uni-directionally among the plurality of nodes.

8. The apparatus as in claim 7 wherein the data and control network symmetrically connects the plurality of nodes in a ring.

9. The apparatus as in claim 7 wherein the data and control network symmetrically connects the plurality of nodes in a plane.

10. The apparatus of claim 7 wherein the data and control network symmetrically connects the plurality of nodes in a parallelpiped.

11. The apparatus as in claim 1 wherein the means for storing is a redundant array of independent disks, and wherein the different portions of each multimedia item are distributed substantially equally among the independent disks of the redundant array.

12. A method for delivering multimedia items to customers via a communications network, comprising the steps of:

distributing portions of each multimedia item over a plurality of nodes, each node including a switch connected to a server, each server including means for connecting to the communications network and means for storing a different portion of a selected multimedia item, and the switch including a first direct memory access engine connected to an input port of the switch, the first direct memory access engine for acquiring the different portions from an adjacent node via the data and control network, and an output buffer connected to an output port, the output buffer for storing the different portions acquired by the first direct memory access engine;

fetching, in response to a customer demand, a portion of a selected multimedia item from the storage means of a source one of the plurality of nodes;

routing the portion to a destination one of the plurality of nodes using a data and control network symmetrically connecting the plurality of nodes;

presenting the portion to the communications network connected to the destination node.

\* \* \* \* \*